(12) United States Patent
Elzer et al.

(10) Patent No.: US 11,560,011 B2
(45) Date of Patent: Jan. 24, 2023

(54) METHOD FOR PRETREATING MATERIALS FOR FLEXOGRAPHY BY MEANS OF MOBILE LOW-TEMPERATURE PLASMA APPLICATION

(71) Applicant: Lohmann GmbH & Co. KG, Neuwied (DE)

(72) Inventors: Timo Elzer, Polch (DE); Peter Harendt, Neuwied (DE)

(73) Assignee: Lohmann GmbH & Co. KG, Neuwied (DE)

( * ) Notice: Subject to any disclaimer, the term of this patent is extended or adjusted under 35 U.S.C. 154(b) by 116 days.

(21) Appl. No.: 16/964,766

(22) PCT Filed: Jan. 25, 2019

(86) PCT No.: PCT/EP2019/051901
§ 371 (c)(1),
(2) Date: Jul. 24, 2020

(87) PCT Pub. No.: WO2019/145504
PCT Pub. Date: Aug. 1, 2019

(65) Prior Publication Data
US 2021/0053379 A1 Feb. 25, 2021

(30) Foreign Application Priority Data

Jan. 25, 2018 (DE) .................... 10 2018 000 588.8

(51) Int. Cl.
*B41N 6/02* (2006.01)
*B41N 6/00* (2006.01)
*C09J 5/02* (2006.01)

(52) U.S. Cl.
CPC ................. *B41N 6/02* (2013.01); *B41N 6/00* (2013.01); *C09J 5/02* (2013.01)

(58) Field of Classification Search
CPC .......... B41N 6/02; B41N 3/006; B41N 3/032; B41N 6/00; C09J 5/02
See application file for complete search history.

(56) References Cited

U.S. PATENT DOCUMENTS 6,912,955 B2 * 7/2005 Invernizzi .............. B41N 10/04
101/375
8,152,944 B2 4/2012 Ellringmann et al.
(Continued)

FOREIGN PATENT DOCUMENTS

CN 101638565 A 2/2010
CN 104995273 A 10/2015
(Continued)

OTHER PUBLICATIONS

International Search Report for corresponding application PCT/EP2019/051901, 7 pages, dated Apr. 30, 2019.
(Continued)

*Primary Examiner* — Daniel J Colilla
(74) *Attorney, Agent, or Firm* — Ruggiero, McAllister & McMahon (57) ABSTRACT

Where printing plate is to be secured to a plate cylinder by means of double-sided adhesive tape, the surface of the printing plate to be secured to the plate cylinder is, prior to bonding, partially pre-treated by means of a low-temperature plasma pencil after cleaning with isopropanol.

4 Claims, 7 Drawing Sheets

(56) References Cited

U.S. PATENT DOCUMENTS

| | | | |
|---|---|---|---|
| 9,788,404 | B2 | 10/2017 | Nettesheim et al. |
| 2005/0064181 | A1 | 3/2005 | Blank et al. |
| 2009/0277562 | A1* | 11/2009 | Ellringmann ............... C09J 7/26 |
| | | | 156/60 |
| 2015/0361307 | A1* | 12/2015 | Van Wert ............... B32B 38/162 |
| | | | 428/317.3 |
| 2018/0022975 | A1* | 1/2018 | Kerber ..................... C09J 11/06 |
| | | | 156/327 |

FOREIGN PATENT DOCUMENTS

| | | |
|---|---|---|
| DE | 10347024 A1 | 7/2005 |
| DE | 10347025 A1 | 7/2005 |
| DE | 102016203413 A1 | 9/2017 |
| EP | 0264894 A2 | 4/1988 |
| EP | 0264894 A2 | 12/1992 |
| EP | 1498281 B1 | 12/2008 |
| JP | S5930832 A | 2/1984 |
| WO | 2014115050 A1 | 7/2014 |

OTHER PUBLICATIONS

Written Opinion for corresponding application PCT/EP2019/051901, 5 pages, dated Apr. 30, 2019.

German Examination Report for corresponding application DE 10 2018 000 588.8, 7 pages, dated Aug. 14, 2018.

Chinese Office Action and Search Report for corresponding Chinese Patent Application No. No. 201980010252.3 ; 15 pages, dated Jun. 11, 2021.

Gao, Jing et al."500 Questions for Flexography" p. 258; First edition, Cultural Development Press, Sep. 30, 2016.

Indian Office Action and Search Report for corresponding Indian Patent Application No. 202027035702; 6 pages, dated Mar. 15, 2022.

Lu et al. "The Plasma Pencil: A Novel Cold Plasma Source for Low Temperature Applications" IEEE, OI:10.1109/PLASMA.2006.1707053, Oct. 9, 2006.

* cited by examiner

| designation adhesive tape | test set-up part 1 | | | | | | | | |
|---|---|---|---|---|---|---|---|---|---|
| | temp. | humidity | adhesive tape assembly | | | | automatic clamping mechanism | | |
| | | | printing plate cylinder | | | | | | |
| | °C | % | commercial designation | cleaning agent | pre-treatment | circumference printing plate cylinder [mm] | number of rotations | pressure [bar] | shore A |
| DuploFLEX 5.3 | 23 | 39 | Rubin | IPOH | none | 380 | 2 | 4 | 20 |
| DuploFLEX 5.3 | 23 | 39 | Rubin | IPOH | none | 380 | 2 | 4 | 20 |
| DuploFLEX 5.3 | 23 | 39 | Rubin | IPOH | none | 380 | 2 | 4 | 20 |
| DuploFLEX 5.3 | 23 | 39 | Rubin | IPOH | none | 380 | 2 | 4 | 20 |
| DuploFLEX 5.3+ | 23 | 39 | Rubin | IPOH | none | 380 | 2 | 4 | 20 |
| DuploFLEX 5.3+ | 23 | 39 | Rubin | IPOH | none | 380 | 2 | 4 | 20 |
| DuploFLEX 5.3+ | 23 | 39 | Rubin | IPOH | none | 380 | 2 | 4 | 20 |

Fig. 4a

| designation adhesive tape | | | test set-up part 2 | | | | | | | |
|---|---|---|---|---|---|---|---|---|---|---|
| | | | printing plate assembly | | | | | | | |
| | | | printing plate | | | | | automatic clamping device | | |
| | commercial designation | cleaning agents | pre-treatment | time between pre-treatment and printing plate assembly | size | thickness [mm] | | number of rotations | pressure [bar] | shore A |
| DuploFLEX 5.3 | ACE | IPOH | no | 30s | DIN A4 | 2,54 | | 2 | 4 | 20 |
| DuploFLEX 5.3 | ACE | IPOH | corona | 30s | DIN A4 | 2,54 | | 2 | 4 | 20 |
| DuploFLEX 5.3 | ACE | IPOH | plasma pencil | 30s | DIN A4 | 2,54 | | 2 | 4 | 20 |
| DuploFLEX 5.3 | ACE | IPOH | primer | 240s | DIN A4 | 2,54 | | 2 | 4 | 20 |
| DuploFLEX 5.3+ | ACE | IPOH | no | 30s | DIN A4 | 2,54 | | 2 | 4 | 20 |
| DuploFLEX 5.3+ | ACE | IPOH | corona | 30s | DIN A4 | 2,54 | | 2 | 4 | 20 |
| DuploFLEX 5.3+ | ACE | IPOH | plasma pencil | 30s | DIN A4 | 2,54 | | 2 | 4 | 20 |
| DuploFLEX 5.3+ | ACE | IPOH | primer | 240s | DIN A4 | 2,54 | | 2 | 4 | 20 |

Fig. 4b

Test results of the application analysis

| designation adhesive tape | peel adhesion properties of the adhesive tape liner | edge lift-off printing plate [mm] | | disassembly properties | | | | | | repositioning | re-usability | comment |
|---|---|---|---|---|---|---|---|---|---|---|---|---|
| | | upper | lower | force | | haptics | | adhesive | | | | |
| | | | | c.s. | o.s. | c.s. | o.s. | sleeve | printing plate | | | |
| DuploFLEX 5.3 | good | 20 | 20 | 2 | | 3 | | | 0 | easy | possible | |
| DuploFLEX 5.3 | good | 12 | 5 | 2 | | 3 | | | 0 | easy | possible | |
| DuploFLEX 5.3 | good | 3 | 2 | 2 | | 3 | | | 0 | easy | possible | |
| DuploFLEX 5.3 | good | 1 | 2 | 4 | | 3 | | | 10 | severely impaired | not possible | 1 cm residue seen from the edge of the printing plate |
| DuploFLEX 5.3+ | good | 15 | 12 | 2 | | 3 | | | 0 | easy | possible | |
| DuploFLEX 5.3+ | good | 11 | 6 | 2 | | 3 | | | 0 | easy | possible | |
| DuploFLEX 5.3+ | good | 2 | 2 | 2 | | 3 | | | 0 | easy | possible | |
| DuploFLEX 5.3+ | good | 1 | 1 | 4 | | 3 | | | 10 | severely impaired | not possible | 1 cm residue seen from the edge of the printing plate |

METHOD FOR PRETREATING MATERIALS FOR FLEXOGRAPHY BY MEANS OF MOBILE LOW-TEMPERATURE PLASMA APPLICATION

CROSS-REFERENCE TO RELATED APPLICATIONS

This application is a national stage U.S. patent application of International Application No. PCT/EP2019/051901, filed Aug. 1, 2019, and claims foreign priority to German Patent Application No. DE 10 2018 000 588.8, filed on Jan. 25, 2018, the entirety of each of which is incorporated herein by reference.

TECHNICAL FIELD

The present disclosure relates to a method for pre-treating materials used in flexography by means of mobile low-temperature plasma applications. This method is used in the pre-treatment of flexographic printing plates and/or plate cylinders both for partial and spatial increase of their adhesive force in bonding processes whilst simultaneously retaining repositioning capacity as well as enhanced releasability after completion of the printing process.

DESCRIPTION OF THE RELATED TECHNOLOGY

In flexographic printing, printing plates are typically secured to plate cylinders using a double-sided adhesive tape. Flexographic printing is a rotary printing procedure. In this, flexographic printing plates including the printing motifs (also referred to as printing plates)—mostly these plates are photo-polymer plates made of UV-sensitive plastics or laser-engraved printing plates made of rubber—are secured to plate cylinders using double-sided adhesive tape. The printing surfaces, which are elevated compared to the non-printing surfaces in these printing plates, are dyed with printing ink prior to printing.

Visually flawless printing execution requires a thoroughly fine-tuned and coordinated interplay of the different components involved in flexographic printing. For example, the adhesive bond between the adhesive tape and the printing plate on the one hand and the adhesive tape and the plate cylinder on the other hand has to be adjusted precisely to the materials to be glued together and also the printing technology requirements. During the bonding process, a certain ability to reposition the printing plates should be retained for the purpose of precise alignment of the printing plates prior to their final securing. The final securing must be adapted such that also following a large number of revolutions of the plate cylinder and thus also a large number of printing movements performed, and also subject to continuous exertion of force due to the rotation movement the bond between the plate and the plate cylinder is flawless and the edges of the printing plate do not lift off. Following completion of the printing process the adhesive tape should moreover be quite easy to remove—i.e. without major exertion of force and destruction—from the cylinder and plate not leaving any residue so that these materials can be re-used. These partially contradictory requirements postulate the use of materials and methods at different points of the flexographic printing process that are as precisely coordinated as possible.

The most frequent drawback in the flexographic printing process manifests itself in the edges of the printing plate lifting off from the cylinder so that no faultless and visually flawless printing image is created. Therefore, the adhesive force of the double-sided adhesive tape must be adjusted such with respect to the bond between the cylinder and the printing plate that after applying the printing plate to the plate cylinder, for the purpose of precise alignment, on the one hand further repositioning remains possible and, on the other hand, the final adhesive bond is also sufficiently secure subject to higher temperatures and faster printing speeds so as to prevent edge lift-off during the printing process whilst the adhesive tape can still be easily removed from the cylinder and the printing plate without leaving any residue after completion of the printing process. In order to achieve this, different tools are used at different points during the printing process that are adjusted precisely to the requirements at that particular point. For example, depending on the selected printing process, the backing materials of the adhesive tapes, the types of adhesive, the layer thicknesses of the adhesive layers or even the adhesive surfaces may vary, wherein the adhesive may cover the entire surface or is provided in the form of certain structures, in particular aimed facilitating the repositioning of the printing plate potentially necessary prior to the plates being finally secured to the plate cylinder. This painstakingly coordinated interaction between these individual components is to effect reliable and permanent adhesion required during the printing process with respect to the surfaces to be glued together.

Another problem generally associated with flexography is the inter-process use of solvents. Frequently, printing plates and plate cylinders are cleaned from residual adhesive using solvents so that they can be re-used. Precise dosage and precise application of solvents, respectively, is hardly possible here so that there is a relatively high risk of undesired contamination of the material in places that should not actually be exposed to solvents.

Similarly, also the printing plates intended for re-use are cleaned of the printing inks using solvents after a completed cycle.

In both cases of solvent use, residual solvent often stays behind on the edges of the printing plates and/or the plate cylinders. As a consequence, when the printing plates are re-used, adhesion between the adhesive tape and the printing plate and/or between the adhesive tape and the cylinder is negatively impaired and the risk ensues of undesired edge lift-off of the printing plate and thus a faulty printing image.

Quite a few property rights exist that describe the optimised interaction of the different components involved in the flexographic printing process. EP 2 867 321 B1 or EP 2 956 517 A1 for example relate to the composition of the adhesive used for flexographic printing, EP 2 890 753 A1 and EP 1 307 342 B1 describe potential advantages of structured adhesive surfaces for the use in double-coated adhesive tapes in flexographic printing, backing materials of adhesive tapes for flexographic printing for example are covered in EP 1 222 069 B1 or U.S. Pat. No. 6,475,324 B1. DE 103 47 025 A1 already describes a double-sided adhesive tape with a film base for fixing printing plates, where the surface of the film base is at least partly modified on one or both sides by plasma treatment, especially plasma-coating, to increase its affinity for the adhesive compositions by increasing the surface energy.

Another possibility to positively influence these different requirements of the printing process in addition to the precisely coordinated interaction of the components involved in the flexographic printing process and in particular so as to counteract the risk of the edges lifting off during the printing process resulting in a negative impairment of the printing image now consists in enhancing for example the adhesive force of the adhesive tapes used by way of generally known and suitable methods. In this context, it is common practice to use liquid primers. Primers are bonding agents that create a bonding bridge between materials or surfaces with poor respective bonding properties or that enhance adhesion in case of particular requirements such as the need for a secure bond despite adversary bonding process conditions such as gluing in a moist environment or at high temperatures. Such aggravating circumstances also apply where the printing plate to be attached to the plate cylinder in a circular arc is to be secured adhesively to the cylinder for the duration of the printing process, because the flexion will exert strong reset forces on the printing plate that must be counter-acted by the bonding process. Typically, primers are applied in thin layers in the form of a solution and require a certain drying time. Hence, the use of primers not only involves an additional work step, but also the dosage of the bonding agent applied in this liquid form is very hard to accurately dispense.

Apart from the use of liquid primers, for example, it has also been common practice for years to physically pre-treat both the surfaces to be glued together and the adhesives used. Such pre-treatment methods include, inter alia, corona, flame or plasma applications serving to clean the surfaces to be glued together, increasing the effective adhesive area by activating the surface and, respectively, generally create more advantageous wettability conditions. However, also these pre-treatment methods do not a priori and generally effect more advantageous bonding conditions but can only be used selectively in respect of the respective individual bonding parameters in hand. Moreover, such pre-treatment methods on the one hand often cannot be precisely dosed and thus even carry the risk of undesired damage and consequently negative effects on the materials to be glued together and, on the other hand, they are fixed and stationary in terms of their use conditions and therefore inflexible, and they can only be implemented subject to increased effort.

It would therefore be desirable to either have a system allowing to forego the use of support tools with respect to secure adhesion, repositioning and releasability of printing plates and plate cylinders in flexography or, in any case, at least have just a single tool that caters for all of the above requirements.

Plasma hand devices were launched relatively recently onto the market, and they operate on the concept of activating the surfaces of the components involved in the bonding process by way of a low temperature plasma obtained at atmospheric pressure prior to bonding, for example as described in WO 2014/115050 A1. Such a device consists at least in a housing and in a voltage source. As a general rule, the join partners are pre-treated with such hand-held plasma devices, i.e. by means of the plasma dispensed by the hand-held device it is possible to clean surfaces and to increase their charge, thus enhancing the adhesive properties of varnish or adhesives on these surfaces. In this context, the plasma is either discharged via some type of light arc or via a piezo-electric effect, resulting from the opposite polarisation directions of the crystal. In this latter method it is advantageous that a cold, non-thermal plasma is generated at more or less room temperature so that the negative effects with respect to this intended use case on the plasma-treated surface are prevented, which may occur in other plasma applications due to increased temperature caused by the plasma treatment.

DE 10 2016 203 413 A1 already relates to the targeted and selective use of a low temperature plasma for bonding processes. What is claimed there is increasing the peeling force of an adherend with respect to an adhesive surface by way of selective, i.e. partial plasma pre-treatment, wherein the adhesive layer comes away cohesively from the surface of the adherend in the areas pre-treated with plasma and adhesively in the non-pre-treated areas.

Targeted and selective here means that the low-temperature plasma is not generated continuously on the materials to be glued together and/or the adhesive surface but only to a limited extent and in particular areas alternating with surfaces that are not treated with plasma.

In contrast to that, flexographic printing requires completely adhesive separation of the adhesive surface from the adherend (i.e. the plate cylinder and the printing plate, respectively) for the purpose of the requisite aspects of repositioning and reuse, whilst, at the same time, high adhesive force is required for the flawless execution of a large number of revolutions of the plate cylinder and thus also a large number of printing movements, without the edges of the printing plate lifting off during this process.

SUMMARY

An object of the present disclosure is to provide an enhanced method for securing a printing plate to a plate cylinder using a double-sided adhesive tape.

Accordingly, a method is identified for securing a printing plate to a plate cylinder using a double-sided adhesive tape. According to the present disclosure, the surface of the printing plate to be secured to the plate cylinder is partially treated with a low-temperature plasma pencil after cleaning with isopropanol and prior to bonding.

Surprisingly, it turned out that subject to targeted and selective use of a low-temperature plasma pencil (for example a piezo-brush low-temperature plasma cannon) all said requirements can be catered for regarding secure and reliable adhesion in flexography, repositioning and releasability.

In an embodiment, the pre-treatment with the low-temperature plasma pencil is essentially continuously carried out across the width of the printing plate at a width of about one centimetre, at both the beginning and the end of the printing plate to be secured around the plate cylinder.

In a further development, the surface of the plate cylinder is treated partially with the low temperature plasma pencil after cleaning with isopropanol and prior to bonding.

In a further embodiment, prior to bonding, the surface of the plate cylinder is treated partially, yet essentially continually, with a low-temperature plasma pencil across the width of the plate cylinder at a width of about one centimetre at the beginning and end point where the printing plate is secured around the plate cylinder.

The printing plates and plate cylinders pre-treated according to said embodiments, respectively, are associated with the advantage that after removing the plate cylinder, following conclusion of the printing process, no residual adhesive remains on the printing plates or the plate cylinder.

Moreover, the pre-treatment with a low-temperature plasma pencil is associated with no drawbacks whatsoever with respect to the requirements of a flawless flexographic print in comparison to a surface that only has been cleaned with isopropanol or that has additionally been pre-treated with corona. However, regarding potential edge lift-off, the values are 2.5 times lower.

Moreover, in respect of the aspect of edge lift-off, it has turned out that the pre-treatment using a low-temperature plasma pencil is associated with potential edge lift-off in the range of 2 or 3 mm from the upper and lower edge, respectively. These values are more or less similar to the results that can be achieved with a surface that in addition to cleaning with isopropanol was also pre-treated with a primer (i.e. values of 1 and 2 mm, respectively). The surface pre-treated with a low-temperature plasma pencil was graded 1 on a scale of 1=mild via 2=moderately impaired to 3=severely impaired, whereas the surface pre-treated with a primer was classed 3. In contrast to the surface pre-treated with the primer, the surface pre-treated by means of the low-temperature plasma pencil could be re-used.

In this context, the adhesive tapes "DuploFLEX 5.3" and "DuploFLEX 5.3+" by the company Lohmann GmbH & Co. KG were used. They are poly-acrylate based adhesive tapes with a foam backing material for the use in flexography, i.e. for taping together printing plates and plate cylinders or sleeves, respectively. As the adhesives of both tapes belong to different adhesive systems, the two tapes are characterised by different peel strength values. Peel strength is generally understood as the force required to pull adhesive tape off of a defined testing surface. The adhesive tape is peeled off at a defined angle of 90° C.≤180° C., and the force is measured in N/cm.

The method for measuring peel strength used here is described as the "cylinder peel method" in the German patent application DE 10 2017 000 494 A1, especially and tailor-made for flexography. It is the object of the device described there to determine the resistance to peel of double-sided adhesive tapes used in flexographic printing both on the open and the covered side of the adhesive tape in a bespoke manner and thus make the process comparable and reproducible, in order to arrive at a facilitated and more reliable way to determine whether the adhesive tape is suitable for the respective printing process. In this context, the open and covered sides of the adhesive tape mean the following: Double-sided adhesive tapes are typically covered with a single release liner. Such a release liner is rendered non-sticky on one side, e.g. by way of a silicone coating. During the application process, unrolling results in the first adhesive side of the adhesive tape—i.e. the side then exposed—being uncovered and applied to a first substrate before the liner is then removed from the still covered side as well.

BRIEF DESCRIPTION OF THE FIGURES

Embodiments of the present disclosure are illustrated in further detail by the subsequent description of the Figures. In this.

DETAILED DESCRIPTION OF EMBODIMENTS

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art.

Throughout the specification and claims, the following terms take the meanings explicitly associated herein, unless the context clearly dictates otherwise. The term "herein" refers to the specification, claims, and drawings associated with the current application. The phrase "in an embodiment" as used herein does not necessarily refer to the same embodiment, though it may. Furthermore, the phrase "in further embodiment" or "a further development" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references.

Figure 1:
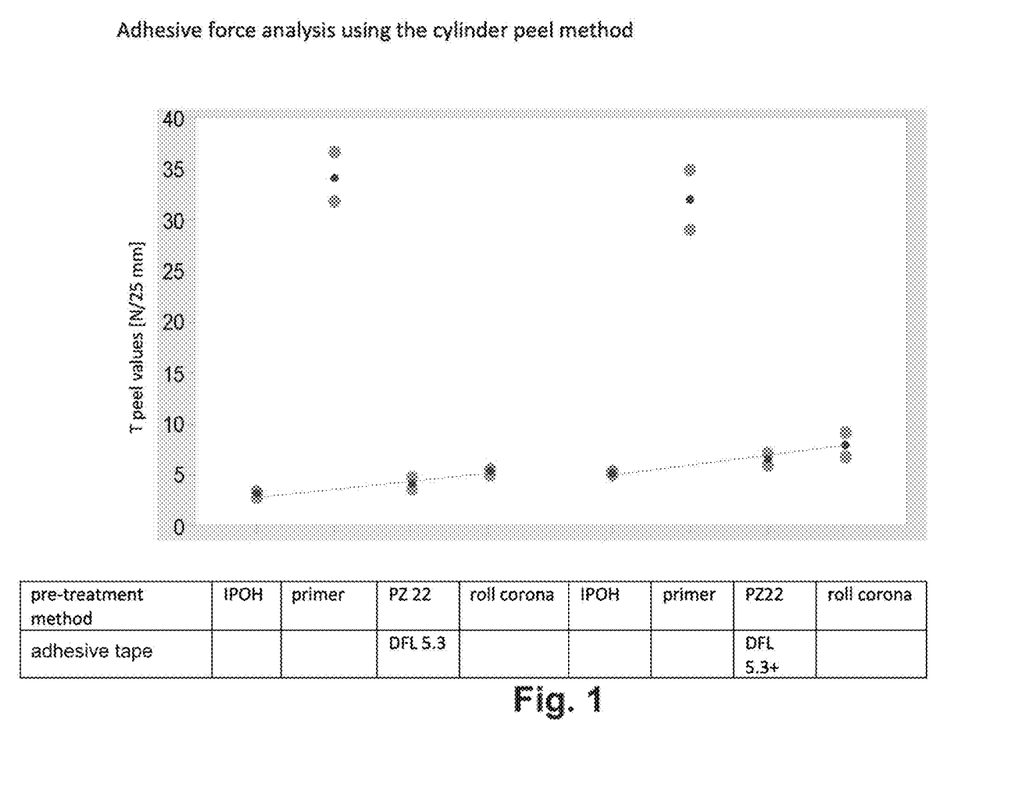
FIG. 1 is a diagram illustrating the adhesive force in relation to the pre-treatment method.

In the case in hand, the adhesive force values were measured between the covered side of the adhesive tape and a surrogate material for photo-polymer plates, i.e. a 125 µm thick PET mylar film (PET-0083) as surrogate substance for the actual plate backing base material, 10 minutes after application (cf. FIG. 1, minimum, maximum and mean value, respectively). It was the objective of this measurement to determine general differences in terms of adhesive force between the two adhesive tapes, irrespective of the actual intended use case, so as to use the results as a reference to analyse differences manifesting themselves down-stream during and also after the actual flexographic printing step in a more objective fashion. The measurements were repeated for a total of 50 times so as to increase reliability of the measurement results. For this purpose, the mylar film was specially pre-treated: in one case it was just cleaned with isopropanol (IPOH), in one case it was pre-treated with isopropanol and a primer pencil ("Lohmann Primer Pen"), in one case it was pre-treated with isopropanol and the low temperature plasma device PZ2 by the company "Relyon Plasma GmbH", and in one case it was pre-treated isopropanol and a conventional roll corona. Ultimately, it turned out that the primer pencil treatment resulted in significantly higher adhesive force values compared to the other three pre-treatment methods.

Figure 2:
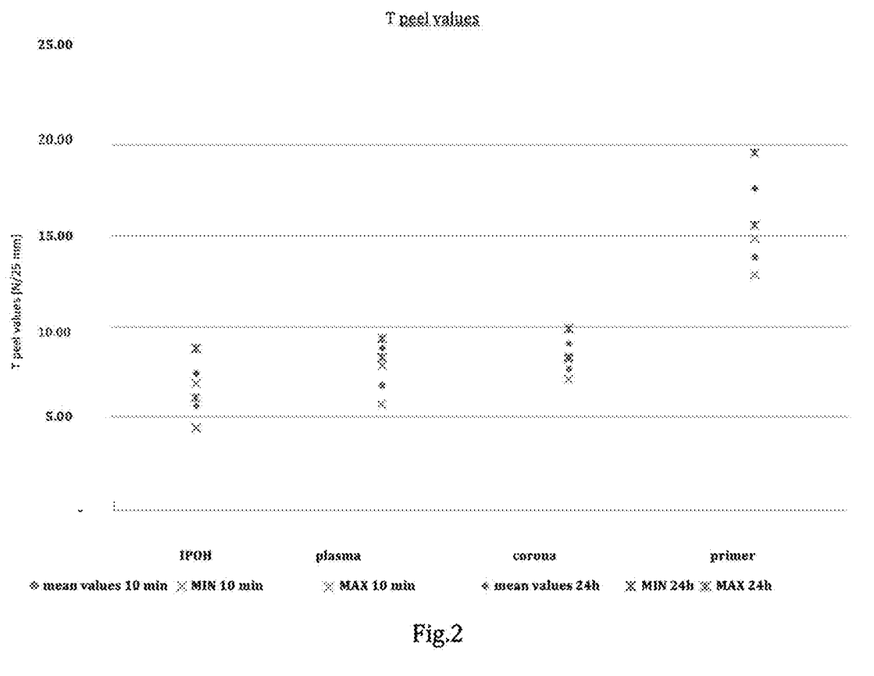
FIG. 2 is a diagram illustrating the T peel values in relation to the pre-treatment method.

By way of comparison and as illustrated in FIG. 2, the peel-strength values were measured using the generally recognised T peel test, again 10 minutes after application, and the illustration shows the respective minimum, maximum and mean value. The T peel test is used for characterising the peel properties of peel systems and is carried out with reference to ASTM D 1876 and DIN 55529. The "T" indicator refers to the presence of two peel arms that are bent °90 during the peel test, resulting in a T shape. The T peel test is carried out on a universal test machine. In this, the clamping length is $I_O$=50 mm and the peel speed is vT=100 mm/min. Generally speaking, the conditions were similar to the results as illustrated in FIG. 1 relating to the "cylinder peel method": The measurements regarding the samples pre-treated with a primer pencil showed significantly higher adhesive forces compared to the other three other pre-treatments.

Figure 3:
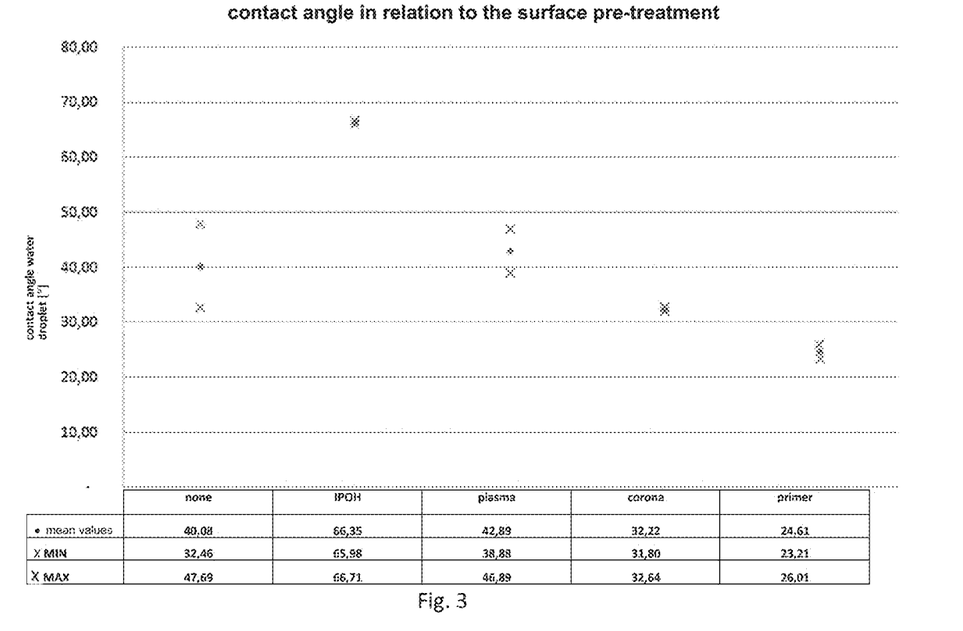
FIG. 3 is a diagram illustrating the contact angle in relation to the pre-treatment method.

FIG. 3 shows the contact angle in relation to the surface pre-treatment. As a matter of principle, surface wettability of constitutes a characteristic that provides information as to whether it is a low-energy surface and thus less suitable for bonding or a high-energy surface and thus better suitable for bonding. Wettability is assessed using a water droplet applied to the surface. If an actual water droplet forms after application, the surface is low-energy, if the water droplet dissolves, however, it is a high-energy surface. Conventionally, test inks are used for a more in-depth analysis regarding wettability, and the contact angle of the droplet is measured (test methods according to DIN 53364 and ASTM D 2578-84). For improved surface adhesion, the contact angle measured should be as small as possible. In this context, the contact angle of the liquid droplet depends on the surface energy of the liquid and the surface to be glued. The four different pre-treatment methods referenced in this application (additionally, the contact angle was measured for a film surface without any surface treatment whatsoever, for comparison) have different effects on the surface energy of the surface to be glued, the best potential adhesion values were reflected in the surface pre-treated with the primer pencil.

Figure 4A:
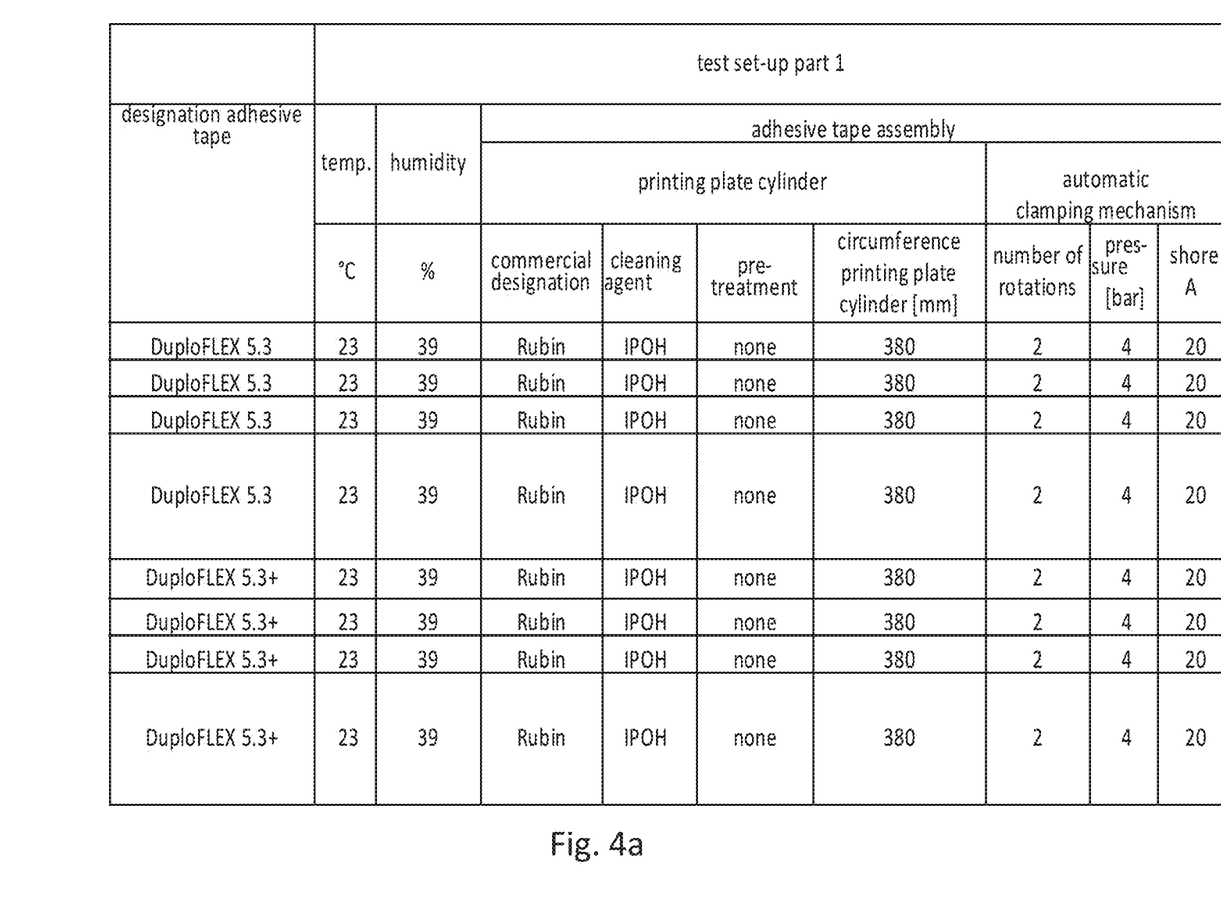
FIG. 4*a* shows the printing process simulation test set-up relevant for flexographic printing, seen from the angle of the plate cylinder.
Figure 4B:
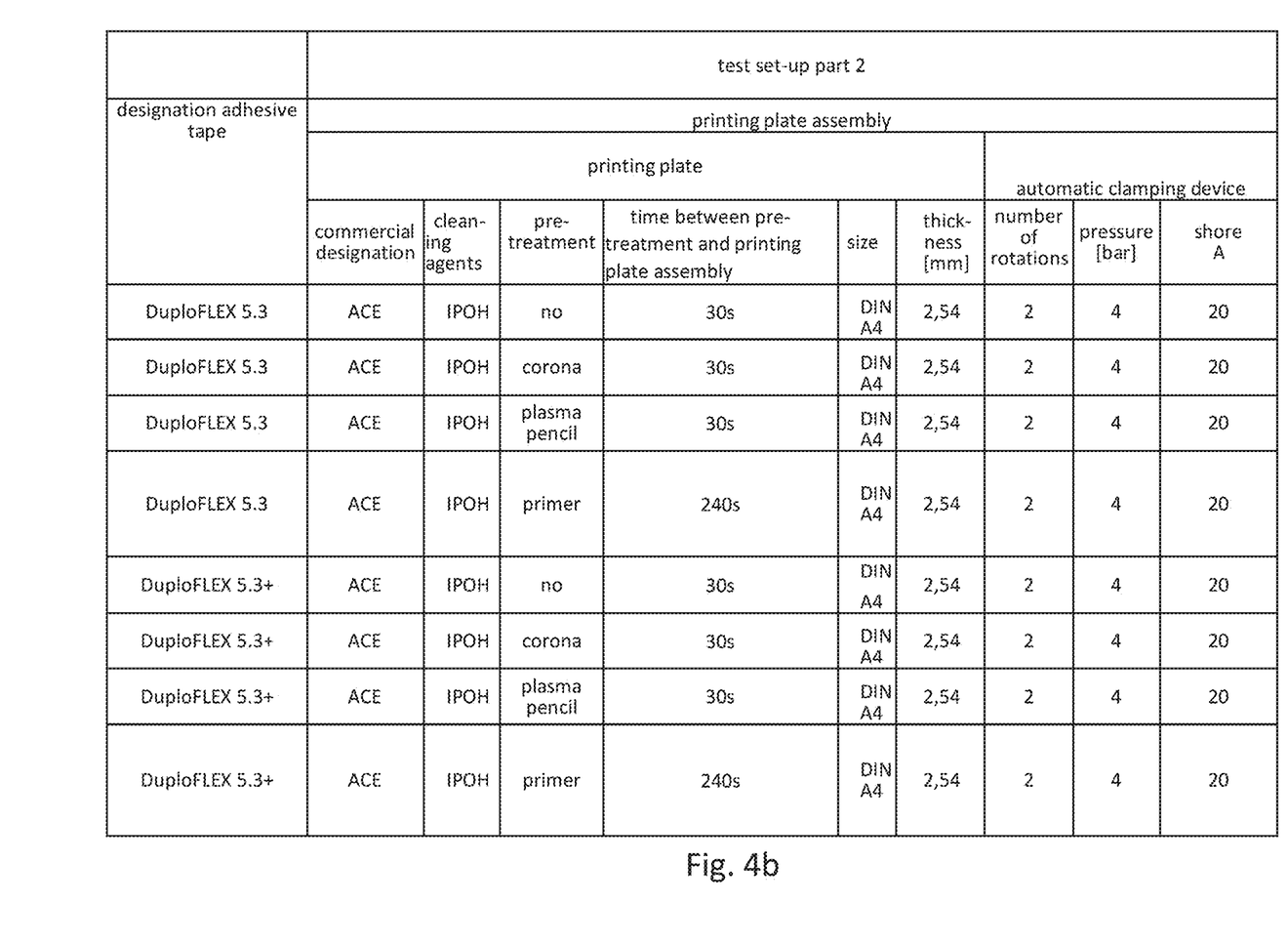
FIG. 4*b* shows the printing process simulation test set-up relevant for flexographic printing, seen from the angle of the printing plate.
Figure 5:
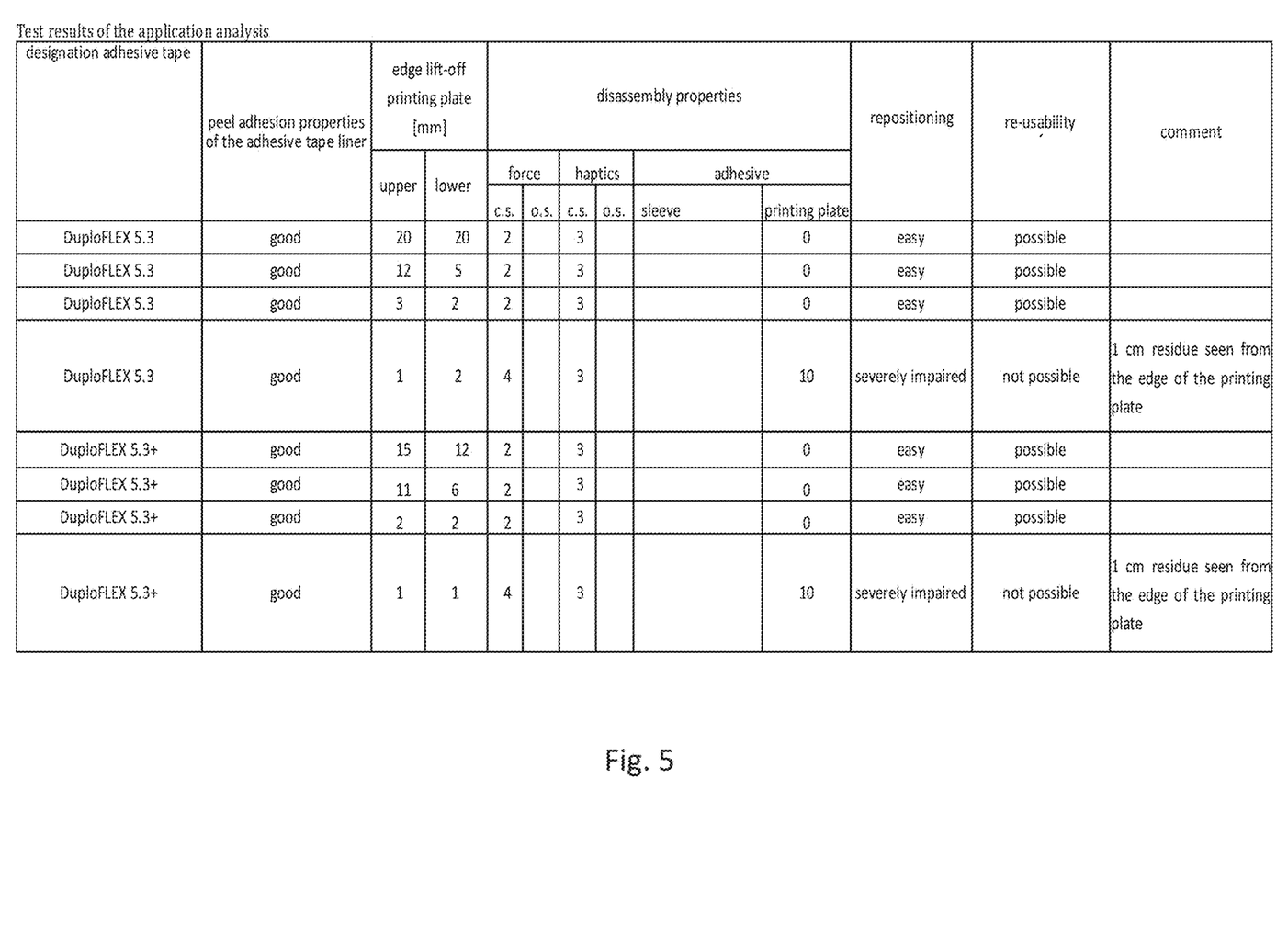
FIG. 5 shows the test results of the technical test during use in respect of the peel adhesion properties of the adhesive tape when being removed from the printing plate after completion of the printing process.

The linked FIGS. 4a and 4b show the test set-up relevant for flexographic printing for the simulation of a printing process, once seen from the side of the plate cylinder (FIG. 4aa) and once seen from the printing plate from (FIG. 4b). FIG. 5 shows the test results of the technical test during use in respect of the peel adhesion properties of the adhesive tape being removed from the printing plate after completion of the printing process. Four different alternatives were tested at identical temperature and humidity parameters. The plate sleeve/sleeve "Rubin" of the company "Polywest Sleeve Systems" with a diameter of 380 mm and a printing plate "ACE" by the company "Flint Group Flexographic Products" with a thickness of 2.54 mm and a shore hardness A of 66 were used, respectively. A conventional hard rubber roller with a shore hardness A of 20 was used both for applying the adhesive tapes to the plate sleeve and for applying the printing plate to the adhesive tape on the sleeve, and a pressure of 4 bar was used, for two revolutions each.

The materials were measured for hardness in accordance with DIN ISO 7619-1. In this set-up, the indentation depth/penetration depth of a steel pin into the material under examination is measured—for shore A the steel pin is shaped like a truncated cone and for shore D it is shaped like a needle tip.

The shore hardness A of 66 of the printing plate is of significance in the case in hand because, given that it is a relatively hard material, interacting with the relatively small circumference of the sleeve of 380 mm and the relative substantial thickness of the printing plate of 2.54 mm, it simulates challenging printing conditions: The printing plate's elasticity properties in connection with the circumference of the sleeve in general cause an increased tendency of the edges of the printing plate to lift off of the sleeve.

Figure 6A:
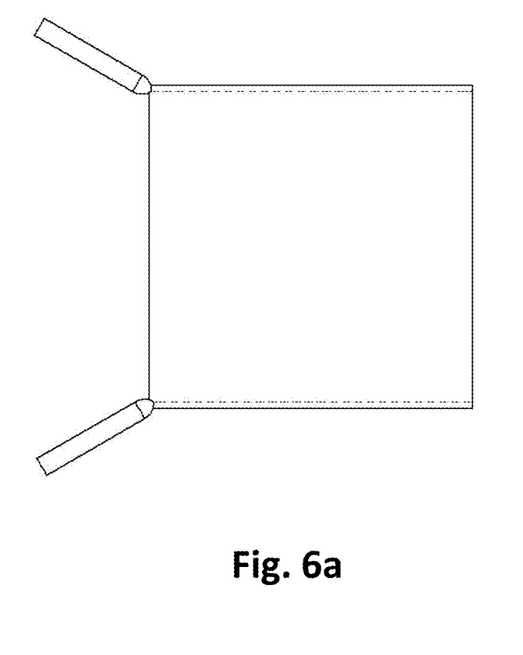
FIG. 6*a* shows the treatment of an unjoined printing plate with a low-temperature plasma pencil.
Figure 6B:
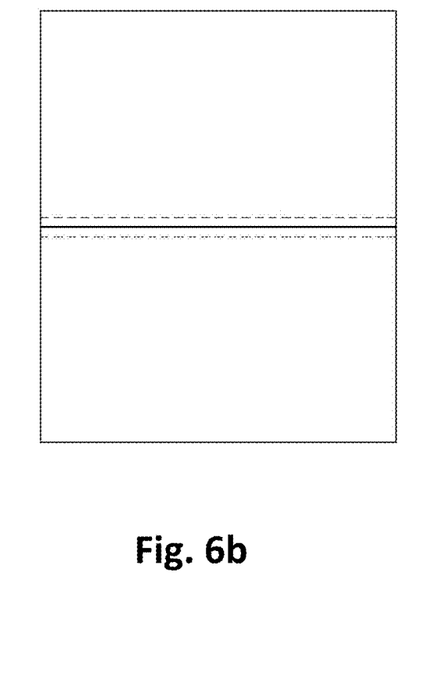
FIG. 6*b* shows a joined printing plate after treatment with a low-temperature plasma pencil.

The following variations were tested: One printing plate was pre-treated only with IPOH, three printing plates were each cleaned with IPOH and additionally pre-treated essentially continually at the respective beginning and end points to be secured to the sleeve at a width of about one centimetre, i.e. once with a primer pencil, once with a roll corona and, as shown in FIGS. 6a and 6b once with a low-temperature plasma pencil. FIG. 6a shows the treatment of the unjoined printing plate with a low-temperature plasma pencil. FIG. 6b shows the joined printing plate after treatment with a low-temperature plasma pencil.

After the simulated printing processes under realistic conditions (i.e. over 5 hours and at a speed of 5 m per minutes), the following parameters in particular were examined and identified (the respective column indicating the values shown in brackets):

The subjective force to be exerted after printing ("force") to remove the adhesive tape from the printing plate on a scale from 1 (very little) to 5 (no longer demountable).

The subjective haptics after printing ("haptics") during removal of the adhesive tape from the printing plate on a scale of 1 (very soft peel adhesion properties) to 5 (very hard peel adhesion properties).

In both tests, only the covered side was relevant ("c.s."=closed side) because the open side ("o.s."=open side) was glued to the sleeve and presently was not the subject matter of the test.

The differences in lift-off of the plate edges ("edge lift-off printing plate") once with reference to the type of pre-treatment and once also with respect to the beginning of the tape ("upper") and its end ("lower"), respectively. The plate edge lift-off is referenced in mm.

Potential residual adhesive on the printing plate that actually was a mix of adhesive, foam backing material of the adhesive tape as well as residual primer (cf. "comment").

The printing process as described was repeated five times (once cleaned with IPOH only, once IPOH+partially primered, once IPOH+partially treated with roll corona or IPOH+ partially treated with a low temperature plasma pencil), the results were essentially identical in all tests and corresponded to the sample results listed here.

The following conclusions could then be drawn in respect of the requirements specified at the beginning concerning secure and reliable bonding in flexographic printing, repositioning and re-usability, respectively as well as releasability.

1) The adhesive force of the adhesive surface was significantly higher in the material to be glued that was pre-treated with a primer in comparison to the three other surface types. This manifested itself firstly in the fact that the edge lift-off was only 1 mm (upper edge) and 2 mm (lower edge), whereas it was 3 and 2 mm, respectively in the surface treated with the plasma pencil and at least 2.5 times higher in the surface pre-treated with corona and the entirely non-pre-treated surface, compared to the primered surface. On the other hand, in the latter surface, the biggest force was required to remove the tape from the printing plate after the printing process—the force required was estimated to be about twice as large compared to the three other surface types, and also repositioning was significantly impaired as a consequence of the increased adhesive force: On a scale of 1=mild via 2=moderately impaired to 3=severely impaired, it was classed as "severely impaired".

2) This increased adhesive force exhibited significant disadvantages during delamination after the printing process in comparison to the three alternative applications in that residual adhesive, foam and primer remained on the edge of the printing plate, namely exactly in the area where the primer was applied prior to bonding. Consequently, the materials could no longer be used (i.e. adhesive tape) or, in any case, only following extensive cleaning (i.e. the printing plate).

3) The preparation time until securing the printing plate to the plate cylinder was significantly longer when the material surfaces were primered compared to the alternatives, caused in particular by the requisite drying time of the primer and the effort required for cleaning the surfaces that are unintentionally contaminated by the primer—it was about eight times longer compared to the three alternatives.

4) Whilst most of the values of the majority of the relevant criteria (preparation time, repositioning, residue, peeling force required after the printing process as well as haptics) were on a similar and comparable level in the surface cleaned only with IPOH and the surface additionally treated with corona or plasma pencil, respectively, the values regarding potential edge lift-off of the printing plate from the plate cylinder during or after completion of the printing process showed significant differences: In that respect, the pre-treatment with the plasma pencil was associated with substantial advantages over the two remaining methods: Edge lift-off of the upper edge was at least four times less and edge lift-off of the lower edge was at least 2.5 times less.

Several repetitions of the tests ultimately showed that only after the fourth repetition of the printing process (i.e. the fifth simulated printing process) using the low-temperature plasma pencil pre-treatment, the results deviated negatively from the results as illustrated, especially in that after that time residual adhesive tape remained on the specimen.

Hence, it is the general conclusion that in respect of said relevant assessment criteria the use of the low-temperature plasma pencil for pre-treating the printing plate after cleaning with isopropanol constitutes the most efficient method for executing flawless flexographic printing. Even more so, in view of the fact that the straightforward multiple re-usability of the components involved in the printing process and the associated reduction of cleaning agents/solvents required for cleaning results in a substantial reduction of environmental impact due to decreased generation of waste products, not to mention significant cost-saving effects.

Generally and applicable in analogy with the tests as illustrated, in respect of the requirements of flexographic printing the plasma pencil can be also used for pre-treating a plate cylinder, as derives also from analogous tests and results not shown in the present application.

As far as applicable, all individual features shown in the sample embodiments can be combined and/or exchanged without leaving the scope of the present disclosure.

The invention claimed is:

1. A method for securing a printing plate to a plate cylinder using a double-sided adhesive tape, comprising:
   cleaning the printing plate to be secured to the plate cylinder with isopropanol;
   partially treating a surface of the printing plate to be secured to the plate cylinder with a low-temperature plasma pencil after the cleaning of the printing plate with isopropanol.

2. The method of claim 1, wherein the treatment with the low-temperature plasma pencil is applied in two continuous lines across a width of the printing plate at a width of about one centimeter at a beginning of the printing plate and at an end of the printing plate at a location where the printing plate is to be secured around the plate cylinder.

3. The method of claim 1, comprising:
   bonding the printing plate to the plate cylinder after the surface of the plate cylinder is partially treated with the low temperature plasma pencil.

4. The method of claim 3, wherein the partial treating of the surface of the plate cylinder comprises, prior to the bonding, partially treating the surface of the plate cylinder with the low-temperature plasma pencil in two continuous lines across a width of the plate cylinder at a width of about one centimeter at a beginning of the printing plate and an end of the printing plate at a location where the printing plate is to be secured around the plate cylinder.

* * * * *